United States Patent [19]
Cezar et al.

[11] Patent Number: 6,161,127
[45] Date of Patent: Dec. 12, 2000

[54] INTERNET ADVERTISING WITH CONTROLLED AND TIMED DISPLAY OF AD CONTENT FROM BROWSER

[75] Inventors: Robert M. Cezar, Arroyo Grande; James Heintz, Pismo Beach, both of Calif.

[73] Assignee: Americomusa, Arroyo Grande, Calif.

[21] Appl. No.: 09/335,384

[22] Filed: Jun. 17, 1999

[51] Int. Cl.[7] .................................................. G06F 13/00
[52] U.S. Cl. ........................................................ 709/203
[58] Field of Search ................................ 705/14, 26, 79; 707/500; 709/200, 202, 203, 217, 219, 224, 227

[56] References Cited

U.S. PATENT DOCUMENTS

| | | | |
|---|---|---|---|
| 5,710,887 | 1/1998 | Chelliah et al. | 705/26 |
| 5,712,979 | 1/1998 | Graber et al. | 709/224 |
| 5,717,860 | 2/1998 | Graber et al. | 709/227 |
| 5,721,827 | 2/1998 | Logan et al. | 709/217 |
| 5,724,424 | 3/1998 | Gifford | 705/79 |
| 5,727,156 | 3/1998 | Herr-Hoyman et al. | 709/219 |
| 5,737,619 | 4/1998 | Judson | 707/500 |
| 5,740,549 | 4/1998 | Reilly et al. | 705/14 |
| 5,751,956 | 5/1998 | Kirsch | 709/203 |
| 5,757,917 | 5/1998 | Rose et al. | 705/79 |
| 5,933,811 | 8/1999 | Angles et al. | 705/14 |
| 5,937,392 | 8/1999 | Alberts | 705/14 |
| 5,948,061 | 9/1999 | Merriman et al. | 709/219 |

FOREIGN PATENT DOCUMENTS

| | | |
|---|---|---|
| 0749081A1 | 12/1996 | European Pat. Off. . |
| WO 97/21183 | 6/1997 | WIPO . |

OTHER PUBLICATIONS

"Internet access: Internet marketing revolution begins in the U.S. this Sep.; Hyper System promises new cash flow for providers, free access for users, & a new marketing opportunity for businesses." Computer Select, *EDGE: Work–Group Comuting Report*, 7(316):2 (1996).

"NetGravity Announces AdServer 2.0, Raises the Standard in Online Advertising Management Software," Website: NetGravity, http://www.netgravity.com/press/as20launch.htm, Oct. 14, 1996.

Booker, E., "Seeing A Gap, A Palo Alto Startup Will Debut Advertising Server for the Net," Website: internet.com, http://www.internetworld.com/print/1996/02/01/industry/ad–server.html, Web Week, vol. 2, Issue 2, Feb. 1996.

Kohda, Y. and Susumu Endo, "Ubiquitous advertising on the WWW: Merging advertisement on the browser," *Computer Networks and ISDN Systems*, 28:1493–1499 (1996).

Metcalfe, B., "From the Ether," Website: Info World Electric, http://www.infoworld.com/cgi–bin/displayArchive.pl?/96/33/o04–33.48.htm, vol. 18, Issue 33, Aug. 12, 1996.

*Primary Examiner*—Robert B. Harrell
*Attorney, Agent, or Firm*—Townsend and Townsend and Crew LLP

[57] ABSTRACT

A central system controller prepares a list of ads to be played, this list being prepared from an "ad played" database maintained at the system controller. This "to be played list" includes ad identity and an ad Internet address. This "to be played list" is first computed and thereafter lodged in the central system controller at peripheral websevers for distribution to browsers. When a browser hits a client website, it is diverted to the system controller at one of the peripheral webservers. The system controller forwards a non-scrolling ad frame set, the "to be played list" of ads to be shown within the non-scrolling frame set, a unique cookie identifier having intervals for recording the identity of ads played together with the day and time of play and processing logic. Once the "to be played list" is installed at the browser, the processing logic compares the "to be played list" at the browser against the record of ads played in the browser cookie. Ads are then played in sequence from the browser in accordance with the "to be played list" with already played ads being eliminated from play by the browser. As each ad is played and timed out, report is made to the system controller at the peripheral webservers. The peripheral webservers batch and periodically forward to the central processor of the system controller the record of ads played. This enables periodic computation and distribution of updated "to be played lists" as well as periodic billing for ads displayed.

16 Claims, 3 Drawing Sheets

INTERNET ADVERTISING WITH CONTROLLED AND TIMED DISPLAY OF AD CONTENT FROM BROWSER

CROSS-REFERENCES TO RELATED APPLICATIONS

This Application and its disclosure continues on with the Disclosure and claims priority from set forth in U.S. patent application Ser. No 09/291,785 filed Apr. 14, 1999 entitled Internet Advertising with Controlled and Timed Display of Ad Content from Centralized System Controller by Robert M. Cezar. In this application, a system of front loading ads to be played in a browser is controlled with the result that the browser directs the playing of ads. The above entitled Application is incorporated to this disclosure by reference as if set forth in full herein.

BACKGROUND OF THE INVENTION

This invention relates to advertising on the Internet and includes ad placement front loaded to browsers from a central system controller. A browser hits a client website and is provided from the system central controller with a non-scrolling ad frame overlaid on the browser screen and a list of ads to be played. A local record of ads played is maintained with the browser cookie and used to edit ads played. A browser controlled and directed sequential playing of consecutive ads results.

It has now become common to load web pages with paid advertising. For example, it is common to see advertisements and web page linked advertisements on many web pages. Simply stated, with a web page linked advertisement, by "clicking" on the ad, forwarding of the browser to the relevant web page of the advertiser occurs.

In a typical advertising supported website, an advertiser supplies ad copy electronically to a website operator. The website operator owns and/or controls a computer or collection of computers knows as the webserver. The website operator creates one or more hyperlinked pages and stores those pages on the webserver, preferably with the ad copy included, or referenced, in one or more of the hyperlinked pages.

A user of a browser that is interested in the website will direct his browser to connect to the webserver and retrieve one or more pages of the website. As the browser displays the pages for the user, the browser displays the ad copy, by virtue of the fact that the website operator included the ad copy in the website pages being viewed.

Unfortunately, the advertiser placing the ad has little control over how the ad is viewed. For example, many web pages are larger than the screen that displays the pages. This being the case, the pages are typically scrolled, and with the scrolling of the pages, the ads are likewise scrolled. Such scrolling brings the ads into and out of view, on a basis where both the advertiser and the agency placing the ad have no control over when the ad is being viewed.

A known solution to scrolling is to place the ad content in a non-scrolling frame. In such an ad, the non-scrolling frame and the ad content is constantly located with respect to the viewed screen of the browser. Thus, both the agencies placing the ad and the advertisers are relatively sure that the ad remains where it may be viewed.

Unfortunately, there is a downside to utilizing a non-scrolling frame.

Specifically, one of the most important ways a website is enabled to have life sustaining "hits" to be indexed with certain general search sites. These general search sites take in the subject matter sought, a name, or combinations of words and direct the inquiring browsers likely websites having the desired information sought. Many such general search sites take information from robotic searchers—searching computer programs that essentially with minimal tending systematically visit and then index websites and the subject matter contained or referred to within the website. It is required that these search engines be able to freely move from website to website to continue their searching and indexing task.

Non-scrolling frames present on a website serve to trap such search engines at a particular website and prevent the search engines from moving on to the next website. The presence of the frame gets the engine caught on the site in a recursive cycle that prevents further search engine movement from the website without time-consuming manual intervention. A solution commonly adapted by designers of search engines is to quickly scan the site for the presence of a frame. Finding a frame, the search engine moves on without further interrogation of the website—and more importantly for the owner of the website—without adding the website to the index. In other words, heretofore, placement of a non-scrolling frame within a website excludes that website from many indexes. And being excluded from many indexes, the website is isolated from what otherwise might be a larger number of revenue earning hits. It therefore become understandable that frames—especially non-scrolling frames—within websites are avoided.

The time of ad content view is another problem. Taking the same situation of a non-scrolling frame, ad content is often changed within the frame on a periodic basis. This change is either programmed or random by the website with respect to any given ad. Since only the website controls the ad content, both the programmed or random display of ad content continues indefinitely so long as the browser remains on the website.

In U.S. patent application Ser. No 09/291,785 filed Apr. 14, 1999 entitled Internet Advertising with Controlled and Timed Display of Ad Content from Centralized System Controller by Robert M. Cezar, an Internet advertising protocol was set forth. In this system, a webserver delivers web pages to a browser while a central controller tracks the extent to which a particular ad is presented to a particular browser. The coding for the web pages is such that the ad does not scroll during browser display of a web page. The content of the ad includes a coded timer, which upon timeout causes the browser to report to the central controller. The system enables precise controlled advertising to each web page viewing browser and accurate advertising budgeting and programming from the central controller. As a consequence, browser advertising is generated which advertising can be monitored and upgraded to meet marketing needs.

The components participating in the system include a host website partitioned at a webserver for transmitting a page. The webserver transmits software to the browser for retrieving a non-scrolling ad frame. Ad content for the non-scrolling ad frame has individual timers for timing out each ad. The timers starts commencing with display at the browser. A central controller with a firewall protected data base directs non-scrolling frame set up in the browser; generates, dispenses and interrogates for unique browser identifiers; maintains records associated with the unique browser identifiers indicating ads displayed and ads available for display; and, finally dispatches to inquiring browsers ad content addresses. The data base provides an audit trail from which websites can be compensated for ad display and advertisers billed for the ad display. Finally, an inquiring browser has the non-scrolling frame set up on the browser, ad content displayed within the browser for a sufficient time interval to timeout the timer, report to the central controller of the display, and retrieval of the address of the next ad content for display.

A subscribing website transmits code that diverts initial browser call to a central controller to retrieve a non-scrolling frame followed by reconnection to the website for continued page loading. Initially, a lead-in ad with timer is loaded from the website to the non-scrolling ad frame and displayed until the timer times out.

It is important to note that the non-scrolling frame never appears at the website; the non-scrolling frame only appears at the browser. This being the case, search engines servicing general search sites are free to come, analyze, and index the contents of the website. Since the non-scrolling frame only appears at the browser—and never at the website—the robotic search engines are neither trapped recursively within the site nor avoid the site because of the presence of a frame.

During timeout of the lead-in ad timer, the central system controller interrogates for a central system controller identifier. Presuming that on first call the browser lacks the central system controller identifier, a unique central system controller identifier is generated at the central controller for the browser together with an address of first ad content to be displayed at the non-scrolling ad frame. Upon lead-in ad timeout, lodging of the unique system controller identifier to the browser occurs with the transmission of the address of the first ad content to be displayed. The browser then fetches the first ad content, displays the first ad content with the display starting a timer within the first ad content. Upon timeout of the timer of the first ad content, the browser makes a return and report to the central system controller in a record associated with the unique central system identifier.

The record associated with the central system identifier is accounted relative to the particular ad content displayed and timed out. For example ad content available for display will be altered noting that one ad has been displayed and timed out. Further, the ads available for display will be altered. This record of the ads available for display as updated by the report is then used to transmit to the reporting browser the address of the next in order ad content and timer for display. The process repeats until the browser leaves the website and resumes when the browser returns to the website.

The system uniquely uses the browser in a scheme of precise timed ad display control. First, the browser is loaded with code, which code interrogates for the presence of the non-scrolling ad frame. If the browser lacks the non-scrolling ad frame, the browser is diverted to the system controller to load the non-scrolling ad frame. the non-scrolling frame never appears at the website. Second, the browser initiates timer running as each ad is displayed. Thus, the advertiser is assured that his particular ad content is displayed for the required minimum time interval. Third, the browser inquires to the central controller for the ad content addresses to be displayed. Thereafter, it is the browser that fetches and loads the ad content to the non-scrolling ad frame on any displayed web page; this minimizes bandwidth transmission at the central controller. Fourth, the browser reports to the system controller the time out of displayed ad content, enabling a precise record of advertising control to be maintained.

The system uses the website minimally in its scheme of precise timed ad display control. The only modification required of the website is that it transmits initial Java code to the inquiring browser to commence running of the system.

Finally, the central system controller enables precision targeted advertising with accountability to the website and proof of advertisement display to the paying advertiser. The central system controller maintains a large database. This large data base includes the unique identifier of each inquiring browser and data for ad content including ad content identity and assurance of the number of times that the identified ad content has been displayed to a browser for a minimum timed interval. This large database, automatically generated as a necessary control for the distributed advertising, generates an audit trail, which can be used for compensation of the website and a billing record for the controlled and distributed advertising.

In this U.S. patent application Ser. No 09/291,785 filed Apr. 14, 1999 entitled Internet Advertising with Controlled and Timed Display of Ad Content from Centralized System Controller by Robert M. Cezar, frequent communication was required between the browser and the central system controller of the advertising protocol. In short, each time a new ad was to be played at a frame set, the browser reported the last time out of the played ad and then received from the system controller the address of the next ad to be played. Central processor computation and connection by the browser to receive the results of the computation was required to designate the next ad to be played. In short, that disclosed system placed an intense Internet connection protocol and computational burden on the central system controller.

SUMMARY OF THE INVENTION

A central system controller prepares a list of ads to be played, this list being prepared from an "ad played" database maintained at the system controller. This "to be played list" includes ad identity and an ad Internet address. This "to be played list" is first computed and thereafter lodged in the central system controller at peripheral websevers for distribution to browsers. When a browser hits a client website, it is diverted to the system controller at one of the peripheral webservers. The system controller forwards a non-scrolling ad frame set, the "to be played list" of ads to be shown within the non-scrolling frame set, a unique cookie identifier having intervals for recording the identity of ads played together with the day and time of play and processing logic. Once the "to be played list" is installed at the browser, the processing logic compares the "to be played list" at the browser against the record of ads played in the browser cookie. Ads are then played in sequence from the browser in accordance with the "to be played list" with already played ads being eliminated from play by the browser. As each ad is played and timed out, report is made to the system controller at the peripheral webservers. The peripheral webservers batch and periodically forward to the central processor of the system controller the record of ads played. This enables periodic computation and distribution of updated "to be played lists" as well as periodic billing for ads displayed.

An advantage of this system is that ad play is essential pre-computed and front end loaded to the browser. Thereafter, all ad play occurs under the direction browser without direct communication required from the central system controller to direct browser ad play.

A further advantage of this system is that the distributed—and largely unused intelligence of remote call browsers is utilized for ad play.

DESCRIPTION OF THE SPECIFIC EMBODIMENTS

Figure 1:
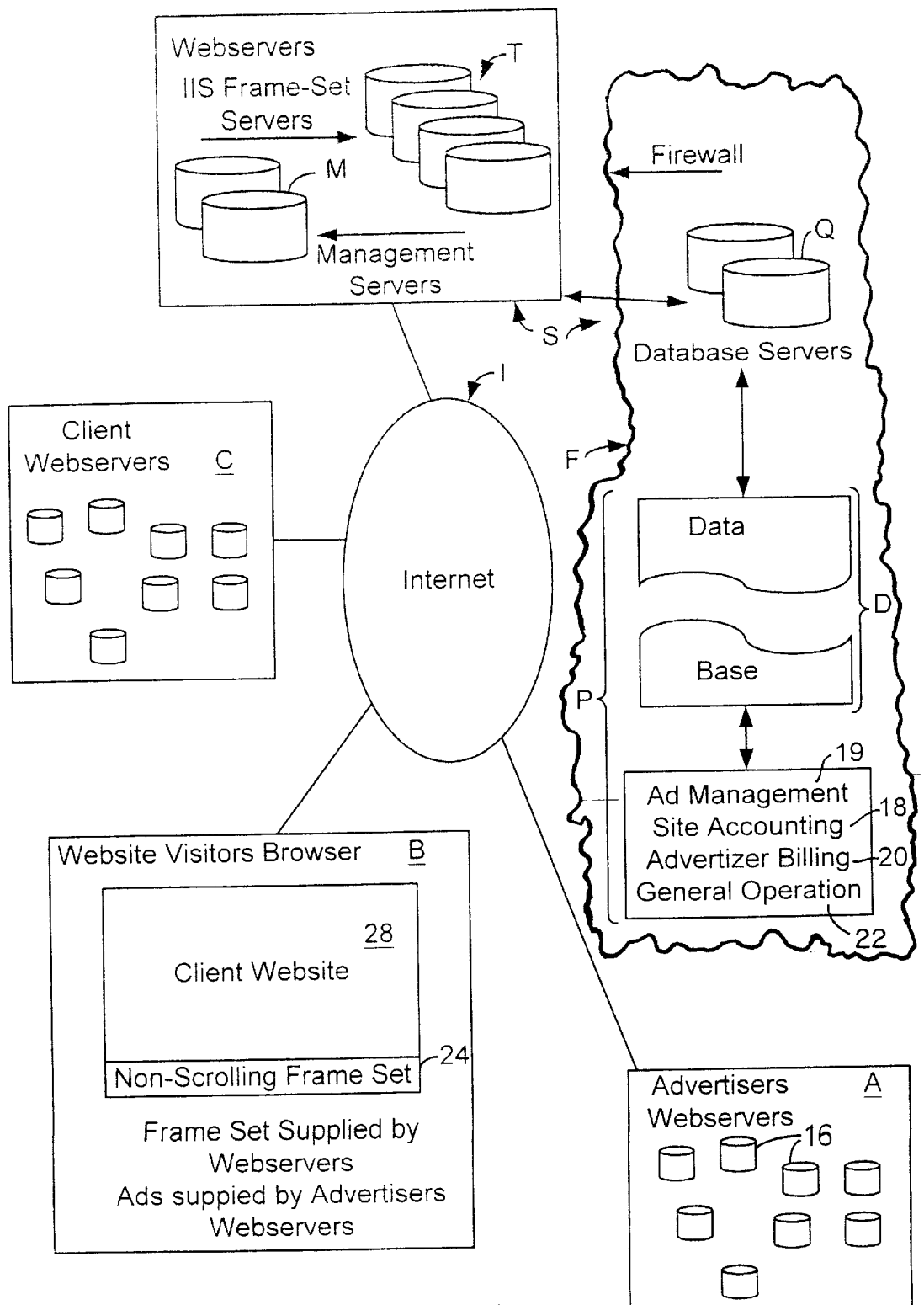
FIG. 1 is a description a general Internet schematic illustrating the central system controller with its peripheral webservers, the client webserver, the ad webserver, and the browser.

System controller S includes two major component parts; webservers W and central processor P. Central processor P is isolated from Internet I by firewall F. Within firewall F this system includes data base servers Q which execute and maintain data base D, a running "real time" record which has output 0.

Utilizing database D, data base servers Q provide first ad management 14. These ad management controls the particular ad content 16 displayed on any browser B.

Second, site accounting 18 is provided. Site accounting 18 is a record of total time interval of the many ad contents 16 that may be displayed through client webservers C. This record may be used to compensate each of the client webservers C for the total time of ad display to particular browsers B.

Third, database D is used for advertising billing 20. As will hereafter become apparent, the identity of the ad content displayed and the identity of the particular browser B are maintained in a record. This record has the ads available for display, those ads already displayed, and the identifier of the particular browser B on which the ads were displayed. Utilizing this record, advertisers can be billed for the services that the system renders.

Fourth, database D is used for general system operation 22. This general system operation can include alteration of the number of times that ad content 16 is displayed, the classification of ad content 16, the time of day of display of ad content 16 and virtually any desired parameter which an advertiser would prefer to control.

System controller S also includes two sets of differing servers connected to Internet I. First, there is frame set servers T. Frames set servers T are interactively called when a browser B calls on a client webservers C for the first time. The inquiring browser B is interrogated for the presence of a non-scrolling ad frame 24. Lacking the presence of non-scrolling ad frame 24, the inquiring browser B is diverted to frame set servers T and non-scrolling ad frame 24 installed on the browser B. Once this interrogation has taken place, inquiring browser B is returned to the particular client webserver A on which call was first made. The interrogation is then repeated, non-scrolling ad frame 24 found, and display of ad content 16 begun. This display of ad content begins with a so-called lead-in ad content 16' from the particular client webserver C. Frame set servers T also supply the Internet addresses and code.

Frame set servers T handles on line active management of the advertising ad content 16. These servers allow outside management to call in and tailor with immediacy the particular ad campaign being run. As far as the disclosure of this invention is concerned, these servers will not further be discussed.

Advertiser webservers A have the ad content 16. The browsers B for display at the non-scrolling ad frame 24 fetch this ad content 16.

In the advertising sales of this system, space for non-scrolling ad frame 24 is "rented" from the operator of each client webserver C. Typically, each website is compensated for making available placement of the non-scrolling frame 24. By having system controller S control the ad content 16, which is displayed within non-scrolling ad frame 24, the ad management of this invention, occurs.

The reader will understand the use of the term "making available. The non-scrolling ad frame 24 never appears on the advertising webserver C. However, the owner of the advertising webserver C understands that when a browser views his website, that browser will in fact have non-scrolling ad frame 24 present on the browser. Thus, the system gives the advertising webserver C the presence of an overlaid non-scrolling ad frame 24, which non-scrolling ad frame 24 never appears on the advertising client webserver C.

Only one browser B is identified in FIG. 1. The reader will understand that many (in the thousands) such browsers B use the system. As will hereafter become apparent, it is particularly important to use the distributed intelligence of browser B to do as much of the "work" for installing the non-scrolling ad frame and for obtaining, timing, reporting, and retrieving ad content 16 displayed within non-scrolling ad frame 24. Thus it is the main purpose of system controller S to control browser B in the installation of the non-scrolling ad frame and in obtaining, timing, reporting, and retrieving of the ad content 16 so that bandwidth at system controller S is appropriately narrowed.

Client webserver C downloads code to browser B. Browser B executes the code and installs the non-scrolling ad frame 24 to the browser only. Thereafter, client webserver C operates normally and without further modification in supplying webpages to the browser B.

Screen 28 of browser B is shown schematically. Once non-scrolling ad frame 24 is installed, lead-in ad content 16' is first displayed. Thereafter, browser B is given identification by system controller S. System controller S, browser B reports ad identity, and time of display for a minimum time interval to system controller S. At the load of the frame set, browser B is given the Internet addresses of further ad content 16 to be displayed, sequentially fetches this ad content 16, displays the ad content 16 for the appropriate time interval, and then reports the display to system controller S. As will hereafter become clear, this cycle essentially endlessly repeats for at least as long as one browser B is connected to one client webserver C. As will hereafter be demonstrated, it is possible to trace the same browser B as it visits related (but not the same) client webservers C.

Finally, the reader will note that advertising webservers A are shown. These sites contain ad content 16. It goes without saying that advertising webservers A can be webservers owned by the advertisers themselves. Further, the ad content 16 dispensed by these advertising webservers A can be altered by the advertiser at will—so long as they conform to the format of this advertising system. Thus it is possible to give the advertiser direct control of ad content and ad duration used with this system.

Figure 2:
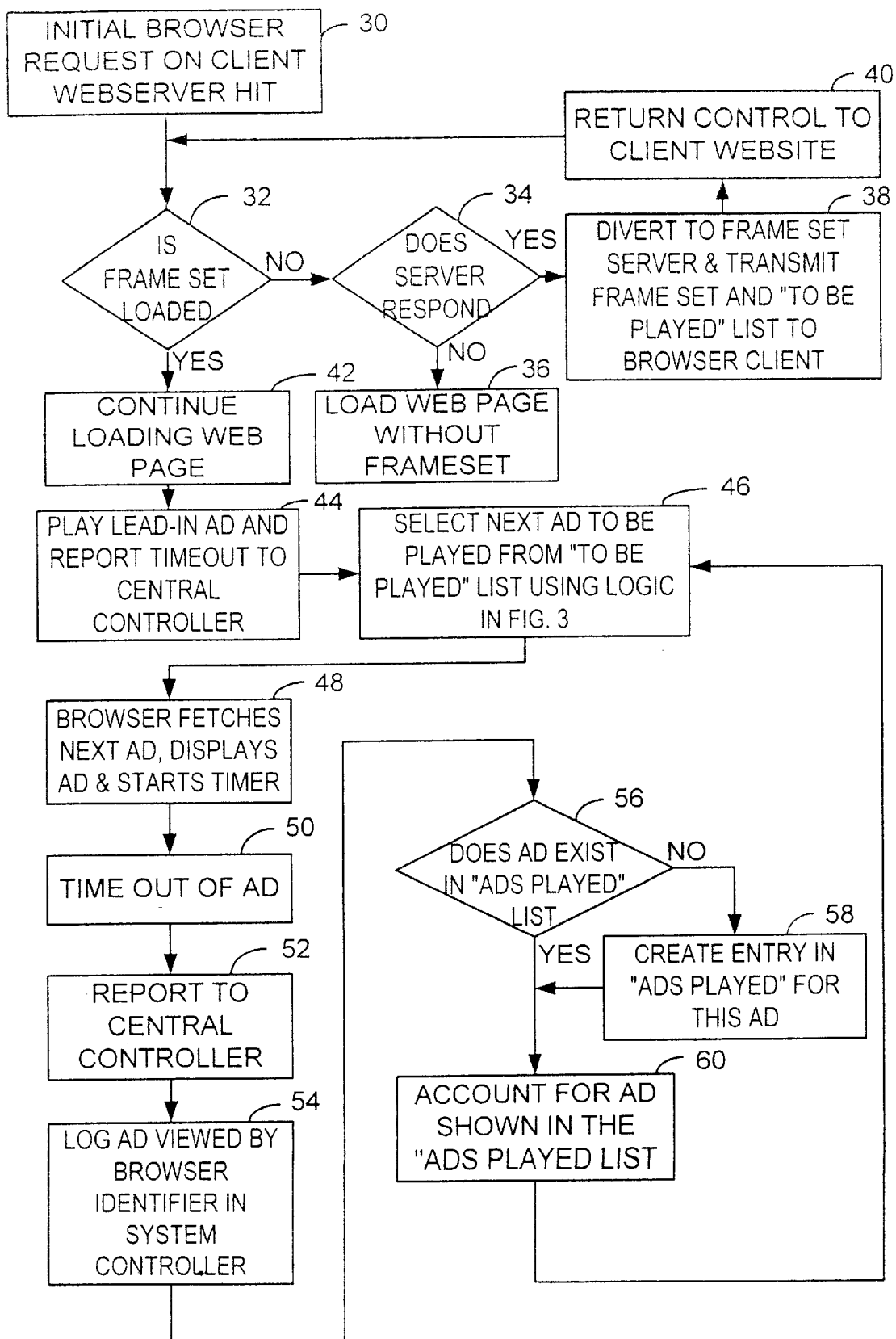
FIG. 2 is a general logic diagram illustrating a system operation presuming that a "to be played list" has been prepared for distribution and lodged to the peripheral webservers of the system controller, the logic diagram presuming that the calling browser is visiting the client website for the first time; and, FIG. 3 is a specific logic diagram illustrating browser executed logic editing play from the "to be played list" in view of "ad played" information stored with the browser cookie.

Referring to FIG. 2, operation of the system of this invention is disclosed from an initial "hit" on client webserver 30. Java code is transmitted to browser B to determine if frame set is loaded 32. Presuming that this is the first request of browser B, diversion occurs to frame set servers T.

There is always the remote possibility that frame set servers T will not respond. If this occurs, there is no commercial reason to interfere with regular web page viewing. Accordingly, does server respond query 34 is made and if the unlikely answer is that it does not respond then load page without frame set 36 occurs.

In the more usual case, diversion to frame set servers T occurs at diverts to frame set server and "to be played" list 38. Once non-scrolling ad frame 24 is loaded, return to client webserver 40 occurs.

At this juncture, frame set is loaded 32 step is answered in the affirmative, and continue loading web page 42 occurs.

The client webservers C are all provided with a lead in ad. Thus, play lead in ad and report 44 to central controller occurs. A first revenue event is generated. The reader should understand that from this point forward, there would be no further direction from the system controller S to the browser B about the sequence of "ads to be played." Instead, all play will occur under the direction of browser B in accordance with the "to be played" list that was forwarded in diverts to frame set server and "to be played" list 38.

It is important to know that the "to be played list" includes the ad identity and the Internet address of the ad. Accordingly, browser selects the next ad to be played 46 in logic that will be detailed with respect to FIG. 3. Thereafter, and once the ad is selected, browser B fetches and plays and starts timer 48. Display occurs until time out of ad 50. Thereafter, report to central controller 52 occurs and a second revenue-generating event occurs. This is posted in the system controller S to the proper account at log ad viewed 54.

In order to have browser B continue to play ads, it must be determined whether the ad played exists in ads played list 56. Upon a negative answer, room is made in the ads played list 58. Thereafter, account for ad shown 60 occurs. As the diagram then makes clear, the cycle repeats until all ads are shown.

U.S. patent application Ser. No 09/291,785 filed Apr. 14, 1999 entitled Internet Advertising with Controlled and Timed Display of Ad Content from Centralized System Controller by Robert M. Cezar is incorporated by reference herein. In that disclosure, it is made clear that the advertising scheme herein includes various classes of ads—preferably up to five classes. Each class of ads in turn contains various specific ads that can be played. The idea set forth in that application is that the ads in the first class are all played before ads in a second class are played. Playing of ads then occurs class by class, until all classes—usually ending with class five—are played.

The reader should understand that playing of all ads takes a considerable period of time. For example, it may take well over one hour to play all ads.

There are certain websites where viewers remain for long periods of time. These can include chat rooms and game sites. There is a remote possibility that all ads on the "to be played" list can be played.

If this occurs, a final group of ads called "X" or exchange ads are run. These latter ads consist of a cross promotion of websites. For example, clients of the system can have ads appear under the "X" ad protocol.

Figure 3:
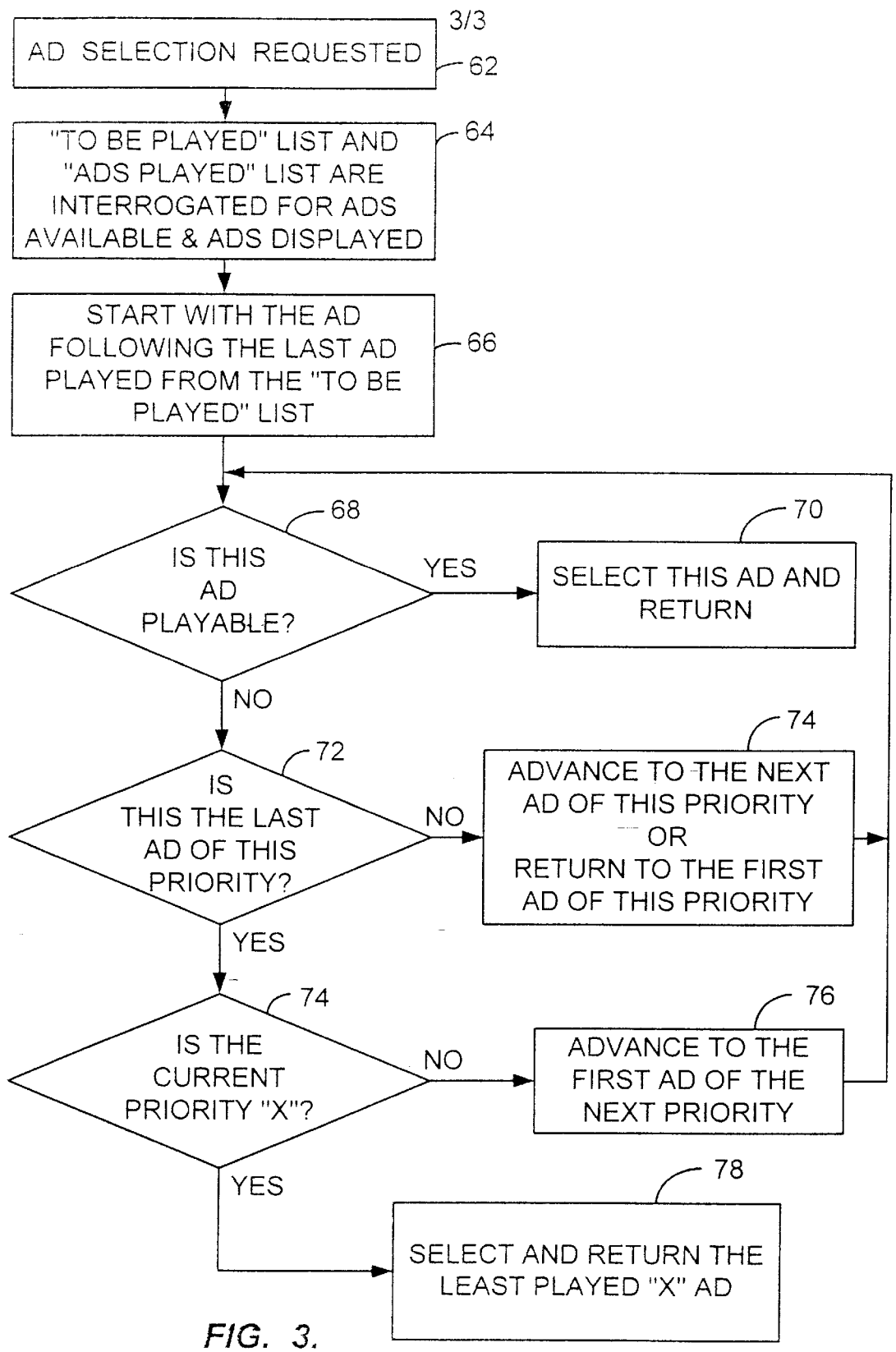

Having reminded the reader of these parameters, the content of FIG. 3 can now be understood. Returning to selects the next ad to be played 46, the logic for this selection is shown. The reader will understand that this logic all occurs at browser B.

Internally of the browser B, ad selection request 62 occurs. This causes immediate reference to the to be played list 64 which was transmitted to browser B at divert to frame set server and "to be played" list 38 step.

At this juncture, comparison of the ad to be played occurs with ads already played. If the ad designated for play has already been played according to records maintained at browser B, the query is answer in the negative at is ad playable 68. In the usual case, the ad will be playable and select play and return 70 step will be executed. Play of the ad following the last ad 66 from the "to be played" list then occurs.

Presuming, that the current category—say the first category of ads to be played is exhausted, is this the last ad of this priority 72 step is executed. If the answer is in the negative, two possibilities are present. One possibility is to advance to the next ad of this priority. Alternately, a return to the first ad of the list can occur. While we prefer the former step, loop step 74 causes all ads of the current priority to be played.

Now take the case where all of the ads of a priority, presumable priority one are played. The system the queries for the exchange ad priority 74. In the usual case, the answer will be in the negative, and advance to first ad of next priority 76 occurs. Thus the cycle will repeat through the next ad category.

Presuming that all cycling through the "to be played" list has occurred, then exchange ad selection 78 occurs starting with the least played exchange ad. Exchange ad play will continue indefinitely.

It will be understood that viewers do not remain on line forever. Rarely will the exchange ads be reached. Further, and when a browser B leaves the client webserver C, all play will cease. The unique browser identifier or "cookie" will remain behind in the browser. In this preferred embodiment, this "cookie" will have room for the record of ads played. Thus, when the browser returns to the same website again, and uses the then issued "to be played" list, it can take up play essentially where the browser B left off play the last time it visited the website. In the following short appendix, we include herewith the code that is run at the browser. Further, we include "in plain language" the contents of the "cookie" or unique browser identifier. The reader will understand that we heavily encrypted our coding in the unique browser identifier to include the identity of the ad played, and the time of ad play. In this fashion, ad campaigns can be tailored as required for both the numbers of plays and time intervals between ad play.

There is attached in the application file, but not printed in this patent, an Appendix. This Appendix lists in the Java Script language the key portions of actual code that is executed in the browser to produce the ad play here set forth.

What is claimed is:

1. An ad display from a website for causing a browser hitting the website to undertake controlled and recorded ad display from a central controller for guaranteed minimum timed intervals comprising the steps of:

providing a plurality of ad contents, each ad content having ad identity, an individual timer for timing out commencing with display at the browser, and an Internet address for fetching by the browser;

providing a website at a webserver for transmitting at least one page to a browser, the at least one page including code for interrogating the browser for presence of a frame set for display of ad contents;

interrogating the browser for the presence of the frame set and not finding the frame set diverting the browser to the central controller;

sending from the central controller a frame set for display of the ad contents, a list of ads to be played in the frame set including the Internet address of the ads to be played;

playing the ad content of at least one of the ads to be played from the list of ads to be played in the frame set of the browser to display the ad content and start the individual timer;

timing out the individual timer of the ad content at the browser;

reporting from the browser to the central controller the timing out of the individual timer of the ad content; and, playing the ad content of another of the ads to be played from the list of ads to be played.

2. An ad display from a website for causing a browser hitting the website to undertake controlled and recorded ad display according to claim 1 and wherein:

the frame set transmitted to the browser is a non-scrolling frame set.

3. An ad display from a website for causing a browser hitting the website to undertake controlled and recorded ad display according to claim 1 and wherein the sending from the central controller step includes:

retaining in the browser the identity and time of ad play; and, comparing the list of ads to be played to ads played to determine the indentity and Internet address of an ad to be played.

4. An ad display from a website for causing a browser hitting the website to undertake controlled and recorded ad display according to claim 3 and wherein:

sending a unique browser identifier; and, placing in the unique browser identifier an interval for the storage of the indentity and time of ad play.

5. An ad display from a website for causing a browser hitting the website to undertake browser controlled and recorded ad display for guaranteed minimum timed intervals comprising the steps of:

providing a website at a webserver for transmitting at least one page to a browser;

providing code at the website for transmission to the browser for interrogating the browser to determine presence of an ad frame in the browser for the display of ad content;

providing ad content for the ad frame, each ad content having ad identity and an individual timer for timing out commencing with display at the browser and an Internet address for fetching by the browser;

interrogating the browser for the presence of the ad frame with the code;

upon not finding the ad frame, diverting the browser to an Internet address for loading the ad frame and a list of ads to be played in the ad frame set including the Internet address of the ads to be played;

using the list of ads to be played having the browser communicate to the Internet address to place the ad content in the ad frame of the browser to display the ad content and start the individual timer;

timing out the individual timer of the ad content at the frame at the browser;

reporting from the browser to the central controller the timer timeout of the ad content; and, playing the ad content of another of the ads to be played from the list of ads to be played.

6. An ad display from a website for causing a browser hitting the website to undertake browser controlled and recorded ad display for guaranteed minimum timed intervals according to claim 5 and wherein:

the frame set transmitted to the browser is a non-scrolling frame set.

7. An ad display from a website for causing a browser hitting the website to undertake browser controlled and recorded ad display for guaranteed minimum timed intervals according to claim 5 and wherein:

retaining in the browser the identity and time of ad play; and, comparing the list of ads to be played to the ads played to determine the indentity and Internet address of an ad to be played.

8. An ad display from a website for causing a browser hitting the website to undertake browser controlled and recorded ad display for guaranteed minimum timed intervals according to claim 5 and wherein:

sending a unique browser identifier; and, placing in the unique browser identifier an interval for the storage of the indentity and time of ad play.

9. A non-scrolling ad display from a website for causing a browser hitting the website to undertake centrally controlled and recorded ad display for guaranteed minimum timed intervals comprising the steps of:

providing a website at a webserver for transmitting at least one page with code for installing a non-scrolling ad frame to a browser;

providing a plurality of classed ad contents for the non-scrolling ad frame, each ad content being from a plurality of similarly classified ad contents with each ad content having ad identity, an individual timer for timing out commencing with display at the browser and an Internet address for fetching by the browser;

diverting the browser to an Internet address for loading the ad frame and a list of ads to be played in the ad frame set including the Internet address of the ads to be played;

using the list of ads to be played, placing ad content in the non-scrolling ad frame of the browser to display the ad content and start the individual timer;

timing out the individual timer of the ad content at the non-scrolling frame at the browser;

reporting from the browser to the central controller the timer timeout of the ad content;

retaining in the browser a record of the ad identity, and the timer timeout of the ad content at the browser;

repeating the placing, timing out, reporting steps to play a plurality of ads from the list of ads to be played.

10. A non-scrolling ad display from a website for causing a browser hitting the website to undertake centrally controlled and recorded ad display for guaranteed minimum timed intervals according to claim 9 and wherein:

the step of providing a list of ads to be played provides providing a list of ads to be placed includes a plurality of ad content being from a first similarly classified ad contents and a plurality of ad contents being from a second similarly classified ad contents; and, repeating the placing, timing out, reporting steps until first similarly classified ad contents is displayed; and then, repeating the placing, timing out, and reporting steps until the second similarly classified ad contents for the non-scrolling ad frame is displayed.

11. The process of using a browser in a scheme of precise timed ad display control wherein the internet includes:

a website at a webserver for transmitting at least one page to a browser;

a central controller for placing a frame set for display of the ad contents, and a list of ads to be played in the frame set including the Internet address of the ads to be played;

ad content for the frame set, each ad content having ad identity and an individual timer for timing out commencing with display at the browser and an Internet address for fetching by the browser; and, the process of using the browser comprising the steps of:

calling the website from the browser;

retrieving at least one page of the website, a frame set for display of the ad contents, a list of ads to be played in the frame set including the Internet address of the ads to be played to the browser;

fetching ad content from at least one of the list of ads to be played using the Internet address of the ads to be played;

displaying ad content fetched for a sufficient duration to time out the timer;

reporting from the browser to the central controller a record of the browser identity, the ad identity, and the timer timeout of the ad content at the browser; and, repeating fetching, displaying, and reporting steps for the display of more than one ad from the list of ads to be played.

12. The process of using a browser in a scheme of precise timed ad display control according to claim 11 and wherein:

the step of retreiving includes:

interrogating the browser for the presence of the frame set;

upon not finding the frame set diverting the browser to load the frame set from an address on the Internet different from the website;

fetching from the site different than the website a frame set for display of the ad contents, a list of ads to be played in the frame set including the Internet address of the ads to be played to the browser.

13. The process of using a browser in a scheme of precise timed ad display control according to claim 11 and wherein:

the step of having the browser then display ad content in the non-scrolling ad frame to start the timer includes:

having the browser retrieve the internet address of the ad content;

using the Internet address of the ad content, having the browser retrieve the ad content;

displaying the retrieved ad content to start the timer.

14. The process of using a browser in a scheme of precise timed ad display control according to claim 11 and wherein:

the frame set transmitted to the browser is a non-scrolling frame set.

15. The process of using a browser in a scheme of precise timed ad display control according to claim 11 and wherein:

retaining in the browser the identity and time of ad play; and, comparing the list of ads to be played to ads played to determine the indentity and Internet address of an ad to be played.

16. The process of using a browser in a scheme of precise timed ad display control according to claim 11 and wherein:

sending a unique browser identifier to the browser; and, placing in the unique browser identifier an interval for the storage of the indentity and time of ad play.

\* \* \* \* \*